US012711868B2

(12) United States Patent
Mizumoto et al.

(10) Patent No.: US 12,711,868 B2
(45) Date of Patent: Aug. 18, 2026

(54) POWER SUPPLY INFORMATION DETERMINATION APPARATUS, POWER SUPPLY INFORMATION DETERMINATION SYSTEM, POWER SUPPLY INFORMATION DETERMINATION METHOD, AND COMPUTER-READABLE MEDIUM

(71) Applicant: NEC Corporation, Tokyo (JP)

(72) Inventors: Hisashi Mizumoto, Tokyo (JP); Toshiaki Yamashita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 468 days.

(21) Appl. No.: 18/007,619

(22) PCT Filed: Jun. 3, 2020

(86) PCT No.: PCT/JP2020/021916

§ 371 (c)(1),
(2) Date: Dec. 1, 2022

(87) PCT Pub. No.: WO2021/245836

PCT Pub. Date: Dec. 9, 2021

(65) Prior Publication Data

US 2023/0237915 A1 Jul. 27, 2023

(51) Int. Cl.
*G08G 5/20* (2025.01)
*G08G 5/25* (2025.01)

(52) U.S. Cl.
CPC ................. *G08G 5/20* (2025.01); *G08G 5/25* (2025.01)

(58) Field of Classification Search
CPC .. G08G 5/0017; G08G 5/0008; G08G 5/0013; G08G 5/0026; G08G 5/0043;
(Continued)

(56) References Cited

U.S. PATENT DOCUMENTS 11,133,684 B1 * 9/2021 Maurer .................. B64U 80/25
2016/0311329 A1 * 10/2016 Rodriguez ............. B60L 58/18
(Continued)

FOREIGN PATENT DOCUMENTS

DE 102017210541 A1 * 12/2018 ............. B60L 53/14
JP 3676323 B2 * 7/2005
(Continued)

OTHER PUBLICATIONS

Machine Translation of KR-20160089267-A, Wireless Power Charging Apparatus Using Superconducting Coil (Year: 2016).*
(Continued)

*Primary Examiner* — Ellis B. Ramirez
(74) *Attorney, Agent, or Firm* — Sughrue Mion, PLLC

(57) ABSTRACT

A power supply information determination apparatus acquires, for each of one or a plurality of landing places each including equipment on which a battery-driven vertical take-off and landing aircraft capable of autonomously flying can land, aircraft information about the aircraft flying in a surrounding region of a landing place, and place information about the landing place. The place information includes facility information indicating a power supply facility and an attached power supply facility capable of supplying power in a landing state and a non-landing state, respectively. Both facilities are provided at the landing place. The apparatus determines a facility of at least one of a power supply facility and an attached power supply facility of each aircraft, a power supply start time to the facility, and a waiting period, based on the acquired information about each aircraft and each landing place, and transmits determined information to the corresponding aircraft.

14 Claims, 8 Drawing Sheets

1

(58) Field of Classification Search

CPC ........ G08G 5/0069; G08G 5/025; G08G 5/00; Y02T 10/70; Y02T 10/7072; Y02T 90/12; Y02T 90/14; B60L 53/16; B60L 53/36; B60L 2200/10; B64U 50/37; B64U 80/25; B64U 80/40; B64U 2101/10; H02J 7/00714; H02J 7/007182; H02J 7/0045

USPC ......... 701/3; 705/7.12, 7.25; 340/455, 636.2

See application file for complete search history.

(56) References Cited

U.S. PATENT DOCUMENTS

| | | | | |
|---|---|---|---|---|
| 2017/0015414 | A1* | 1/2017 | Chan | B64U 10/14 |
| 2017/0278410 | A1* | 9/2017 | Byers | G08G 5/0026 |
| 2017/0344000 | A1* | 11/2017 | Krishnamoorthy | B64F 1/362 |
| 2018/0229859 | A1* | 8/2018 | Evans | H02J 50/90 |
| 2018/0231971 | A1* | 8/2018 | Greenberger | G08G 5/0069 |
| 2019/0126769 | A1* | 5/2019 | Schmalzried | G08G 5/0069 |
| 2019/0299802 | A1* | 10/2019 | Neubecker | B60L 53/68 |
| 2020/0036232 | A1* | 1/2020 | Jones | H02J 7/0013 |
| 2020/0130510 | A1* | 4/2020 | Eck | B60L 53/14 |
| 2020/0269977 | A1* | 8/2020 | Noble | G08G 5/006 |
| 2021/0053677 | A1* | 2/2021 | Passley | B64U 70/95 |
| 2022/0055761 | A1* | 2/2022 | Kamio | B60L 3/0092 |

FOREIGN PATENT DOCUMENTS

| | | | | | |
|---|---|---|---|---|---|
| JP | 2012-071645 | A | | 4/2012 | |
| JP | 2017-177912 | A | | 10/2017 | |
| JP | 2018-177135 | A | | 11/2018 | |
| JP | 2019-006238 | A | | 1/2019 | |
| JP | 2019-016030 | A | | 1/2019 | |
| JP | 2019-069690 | A | | 5/2019 | |
| JP | 2019-121405 | A | | 7/2019 | |
| KR | 20160089267 | A | * | 7/2016 | H02J 7/025 |
| WO | WO-2019059394 | A1 | * | 3/2019 | G06Q 10/083 |

OTHER PUBLICATIONS

Machine Translation of JP-3676323-B2 (2005) (Year: 2005).*

International Search Report for PCT Application No. PCT/JP2020/021916, mailed on Aug. 25, 2020.

JP Office Action for JP Application No. 2023-115626, mailed on Jan. 30, 2024 with English Translation.

* cited by examiner

POWER SUPPLY INFORMATION DETERMINATION APPARATUS, POWER SUPPLY INFORMATION DETERMINATION SYSTEM, POWER SUPPLY INFORMATION DETERMINATION METHOD, AND COMPUTER-READABLE MEDIUM

This application is a National Stage Entry of PCT/JP2020/021916 filed on Jun. 3, 2020, the contents of all of which are incorporated herein by reference, in their entirety.

TECHNICAL FIELD

The present disclosure relates to a power supply information determination apparatus, a power supply information determination system, a power supply information determination method, and a computer-readable medium.

BACKGROUND ART

Patent Literature 1 describes a take-off and landing apparatus being removable from an upper portion of heat source equipment installed outside, and including a take-off and landing unit that provides a space in which an unmanned aircraft can take off and land.

Patent Literature 2 describes a charging apparatus that charges a battery of a drone by using an electromagnetic wave or the like in a non-contact manner.

CITATION LIST

Patent Literature

[Patent Literature 1] Japanese Unexamined Patent Application Publication No. 2019-006238
[Patent Literature 2] Japanese Unexamined Patent Application Publication No. 2018-177135

SUMMARY OF INVENTION

Technical Problem

A battery capacity of an aircraft such as a battery-driven unmanned aircraft is limited, and thus, a landing place may need to be changed according to various situation changes in a surrounding region such as an environmental change in weather and the like, and flying of a suspicious aircraft. Thus, a method of appropriately charging an aircraft according to such situation changes is desired, but the techniques described in Patent Literatures 1 and 2 cannot handle the situation.

the present disclosure has been made in order to solve the above-described problem, and an object thereof is to provide a power supply information determination apparatus, a system, a method, and a readable medium that are able to efficiently determine information about power supply for a plurality of aircrafts according to a situation change in a surrounding region of each of one or a plurality of landing places.

Solution to Problem

A power supply information determination apparatus according to a first aspect of the present disclosure includes: an acquisition unit configured to acquire, for each of one or a plurality of landing places each including equipment on which an aircraft being a battery-driven vertical take-off and landing aircraft capable of autonomously flying can land, aircraft information being information about the aircraft flying in a surrounding region of a landing place, and place information being information about the landing place and including facility information indicating a power supply facility that is provided at the landing place and capable of supplying power in a landing state, and an attached power supply facility that is provided at the landing place and capable of supplying power in a non-landing state; a determination unit configured to perform determination of a facility of at least one of a power supply facility and an attached power supply facility of each aircraft, a power supply start time to the facility, and a waiting period, based on the aircraft information about each aircraft and the place information about each landing place that are acquired by the acquisition unit; and a communication unit configured to transmit, to the corresponding aircraft, information indicating a facility of each aircraft, a power supply start time, and a waiting period that are determined by the determination unit.

A power supply information determination apparatus according to a second aspect of the present disclosure includes: an acquisition unit configured to acquire, for each of one or a plurality of landing places each including equipment on which an aircraft capable of autonomously flying can land, aircraft information being information about the aircraft flying in a surrounding region of a landing place, and place information being information about the landing place and including facility information indicating a power supply facility that is provided at the landing place and capable of supplying power in a landing state, and an attached power supply facility that is provided at the landing place and capable of supplying power in a non-landing state; and a determination unit configured to perform determination of a priority level for using a facility of at least one of a power supply facility and an attached power supply facility of each aircraft among aircrafts flying in the surrounding region, based on the aircraft information about each aircraft and the place information about each landing place that are acquired by the acquisition unit.

A power supply information determination system according to a third aspect of the present disclosure includes: an acquisition unit configured to acquire, for each of one or a plurality of landing places each including equipment on which an aircraft being a battery-driven vertical take-off and landing aircraft capable of autonomously flying can land, aircraft information being information about the aircraft flying in a surrounding region of a landing place, and place information being information about the landing place and including facility information indicating a power supply facility that is provided at the landing place and capable of supplying power in a landing state, and an attached power supply facility that is provided at the landing place and capable of supplying power in a non-landing state; a determination unit configured to perform determination of a facility of at least one of a power supply facility and an attached power supply facility of each aircraft, a power supply start time to the facility, and a waiting period, based on the aircraft information about each aircraft and the place information about each landing place that are acquired by the acquisition unit; and a communication unit configured to transmit, to the corresponding aircraft, information indicating a facility of each aircraft, a power supply start time, and a waiting period that are determined by the determination unit.

A power supply information determination system according to a fourth aspect of the present disclosure includes: an acquisition unit configured to acquire, for each of one or a plurality of landing places each including equipment on which an aircraft capable of autonomously flying can land, aircraft information being information about the aircraft flying in a surrounding region of a landing place, and place information being information about the landing place and including facility information indicating a power supply facility that is provided at the landing place and capable of supplying power in a landing state, and an attached power supply facility that is provided at the landing place and capable of supplying power in a non-landing state; and a determination unit configured to perform determination of a priority level for using a facility of at least one of a power supply facility and an attached power supply facility of each aircraft among aircrafts flying in the surrounding region, based on the aircraft information about each aircraft and the place information about each landing place that are acquired by the acquisition unit.

A power supply information determination method according to a fifth aspect of the present disclosure includes: an acquisition step of acquiring, for each of one or a plurality of landing places each including equipment on which an aircraft being a battery-driven vertical take-off and landing aircraft capable of autonomously flying can land, aircraft information being information about the aircraft flying in a surrounding region of a landing place, and place information being information about the landing place and including facility information indicating a power supply facility that is provided at the landing place and capable of supplying power in a landing state, and an attached power supply facility that is provided at the landing place and capable of supplying power in a non-landing state; a determination step of performing determination of a facility of at least one of a power supply facility and an attached power supply facility of each aircraft, a power supply start time to the facility, and a waiting period, based on the aircraft information about each aircraft and the place information about each landing place that are acquired in the acquisition step; and a communication step of transmitting, to the corresponding aircraft, information indicating a facility of each aircraft, a power supply start time, and a waiting period that are determined in the determination step.

A power supply information determination method according to a sixth aspect of the present disclosure includes: an acquisition step of acquiring, for each of one or a plurality of landing places each including equipment on which an aircraft capable of autonomously flying can land, aircraft information being information about the aircraft flying in a surrounding region of a landing place, and place information being information about the landing place and including facility information indicating a power supply facility that is provided at the landing place and capable of supplying power in a landing state, and an attached power supply facility that is provided at the landing place and capable of supplying power in a non-landing state; and a determination step of performing determination of a priority level for using a facility of at least one of a power supply facility and an attached power supply facility of each aircraft among aircrafts flying in the surrounding region, based on the aircraft information about each aircraft and the place information about each landing place that are acquired in the acquisition step.

A computer-readable medium according to a seventh aspect of the present disclosure is a non-transitory computer-readable medium storing a program for causing a computer to execute: an acquisition step of acquiring, for each of one or a plurality of landing places each including equipment on which an aircraft being a battery-driven vertical take-off and landing aircraft capable of autonomously flying can land, aircraft information being information about the aircraft flying in a surrounding region of a landing place, and place information being information about the landing place and including facility information indicating a power supply facility that is provided at the landing place and capable of supplying power in a landing state, and an attached power supply facility that is provided at the landing place and capable of supplying power in a non-landing state; a determination step of performing determination of a facility of at least one of a power supply facility and an attached power supply facility of each aircraft, a power supply start time to the facility, and a waiting period, based on the aircraft information about each aircraft and the place information about each landing place that are acquired in the acquisition step; and a communication step of transmitting, to the corresponding aircraft, information indicating a facility of each aircraft, a power supply start time, and a waiting period that are determined in the determination step.

A computer-readable medium according to an eighth aspect of the present disclosure is a non-transitory computer-readable medium storing a program for causing a computer to execute: an acquisition step of acquiring, for each of one or a plurality of landing places each including equipment on which an aircraft capable of autonomously flying can land, aircraft information being information about the aircraft flying in a surrounding region of a landing place, and place information being information about the landing place and including facility information indicating a power supply facility that is provided at the landing place and capable of supplying power in a landing state, and an attached power supply facility that is provided at the landing place and capable of supplying power in a non-landing state; and a determination step of performing determination of a priority level for using a facility of at least one of a power supply facility and an attached power supply facility of each aircraft among aircrafts flying in the surrounding region, based on the aircraft information about each aircraft and the place information about each landing place that are acquired in the acquisition step.

Advantageous Effects of Invention

According to the present disclosure, a power supply information determination apparatus, a system, a method, and a readable medium that are able to efficiently determine information about power supply for a plurality of aircrafts according to a situation change in a surrounding region of each of one or a plurality of landing places, are able to be provided.

EXAMPLE EMBODIMENT

First Example Embodiment

Figure 1:
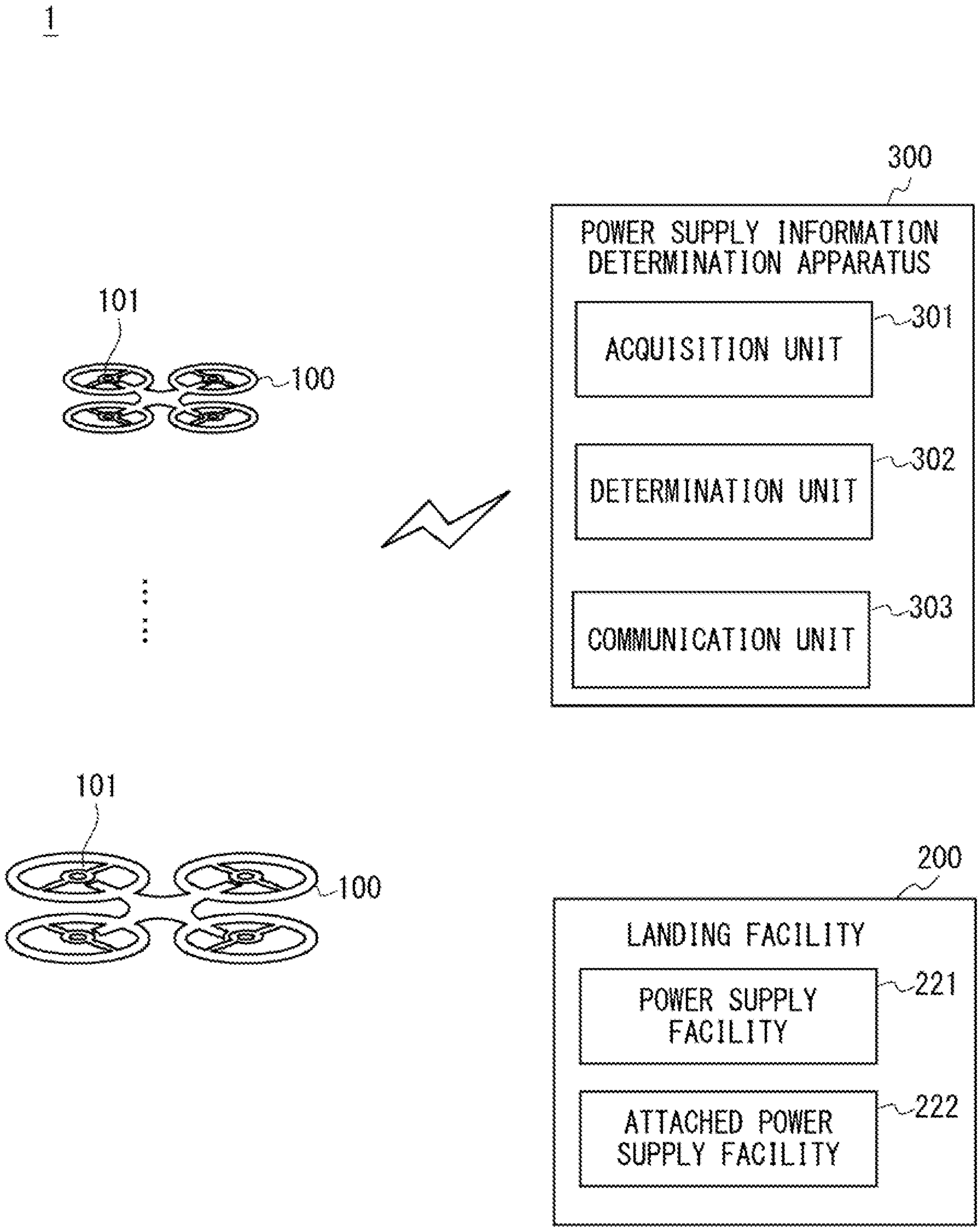
FIG. 1 is a schematic diagram showing a power supply information determination system according to a first example embodiment.
Figure 2:
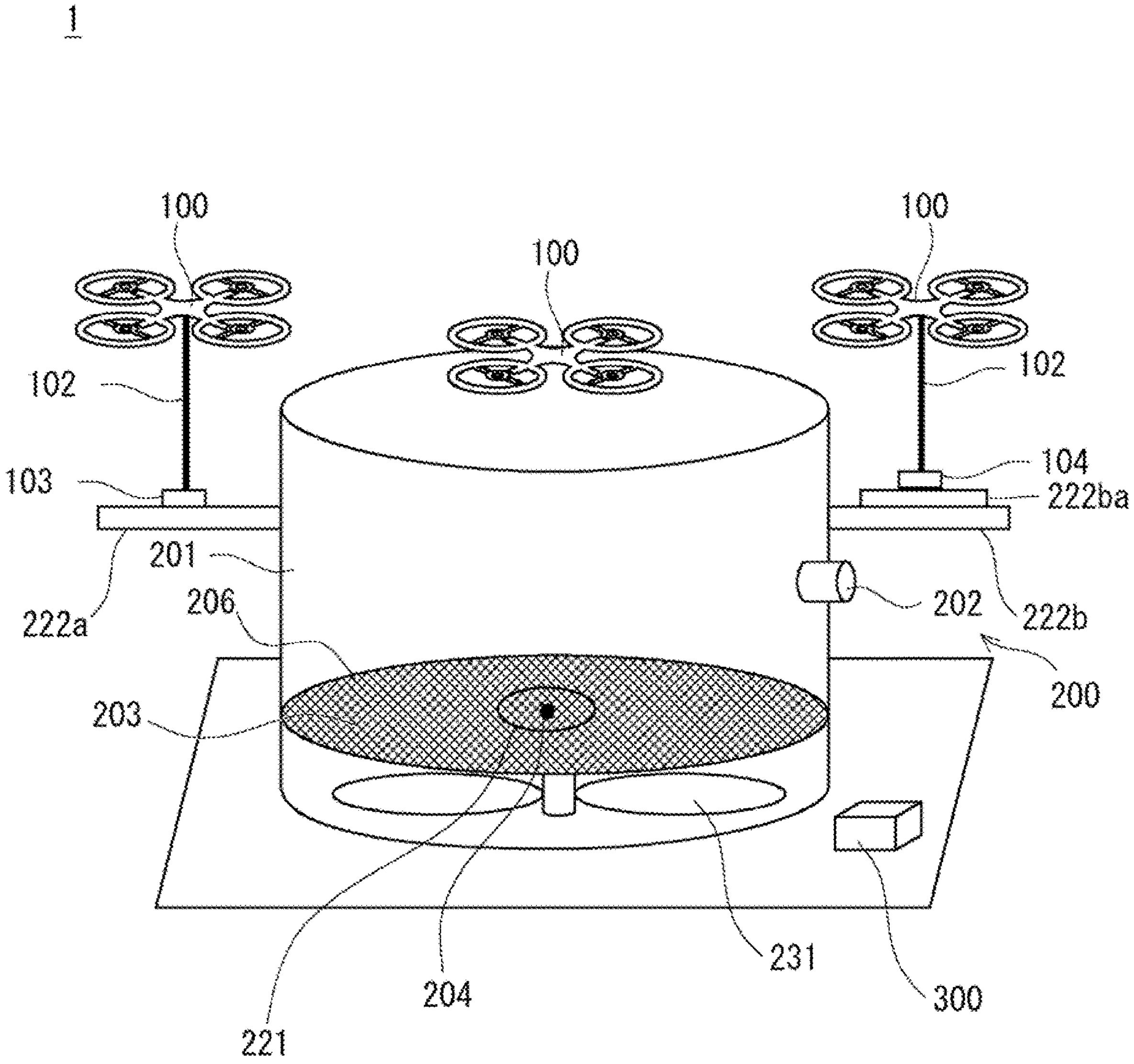
FIG. 2 is a schematic diagram showing one configuration example of the power supply information determination system.

A power supply information determination system 1 according to the present first example embodiment will be described by using FIGS. 1 and 2. FIG. 1 is a diagram schematically showing the power supply information determination system 1, and FIG. 2 is a schematic diagram showing one configuration example of the power supply information determination system 1.

The power supply information determination system 1 can function as a part of an aircraft system for determining a path of an aircraft. The power supply information determination system 1 includes a plurality of aircrafts 100, one or a plurality of landing places (landing facilities 200), and a power supply information determination apparatus 300. The power supply information determination apparatus 300 may be formed as one apparatus, but may also be formed as a distributed system in which a function, information about a processing target, and the like are distributed in a plurality of apparatuses, and, in this case, the power supply information determination apparatus 300 may be referred to as a power supply information determination system. When the power supply information determination apparatus 300 is formed of a plurality of apparatuses, the power supply information determination apparatus 300 can also be installed in each of the landing facilities 200, for example.

Each of the aircraft 100 is a rotary-wing aircraft including rotor blades 101. As the rotor blades 101 are rotationally driven, lift and thrust are generated. Note that, although the aircraft 100 includes four rotor blades 101 in FIG. 1, the number of rotor blades is not limited to any particular number. Further, the plurality of aircraft 100 may be the same type of aircraft (e.g., the same model), or may be different types of aircraft.

Each of the aircraft 100 is an aircraft that can autonomously fly and can execute vertical take-off and landing. Examples of the aircraft 100 include drones, unmanned aerial vehicles (UAVs: Unmanned Aerial Vehicles), and flying cars (cars), and a size and a shape thereof are not limited. The aircraft 100 may be an electric vertical take-off and landing (eVtol: electric Vertical Take-Off and Landing) aircraft. The aircraft 100 may be a tilt-rotor aircraft. The aircraft 100 may be a helicopter. Further, the aircraft 100 may not include the rotor as long as the aircraft 100 can perform an autonomous flight and can execute vertical take-off and landing. The aircraft 100 may be an unmanned aircraft loaded with luggage or the like, or may be a manned aircraft in which a crew(s) and/or a passenger(s) are on board.

The aircraft 100 can autonomously fly along a flight path (i.e., a flight route) from a take-off place to a landing place. For example, the aircraft 100 takes off from a take-off and landing facility and flies along a flight path. When the aircraft 100 has flown to the landing place corresponding to the destination, it lands on the landing place. The flight path is a three-dimensional path from the take-off place to the landing place. The take-off place and the landing place are take-off and landing facilities designated in advance. Note that the take-off place and the landing place may be arbitrary places as long as there is an enough space for the landing therein, but, as described below, a landing place to be a target of a determination in the present example embodiment is a place including a facility of power supply. Needless to say, the take-off and landing facility on which the aircraft lands may be the same as the take-off and landing facility from which the aircraft has taken off. The flight path can be generated in advance by a flight path generation apparatus that is not illustrated or a flight path generation unit incorporated in the power supply information determination apparatus 300.

Further, the aircraft 100 includes a driving unit driven by a secondary battery (battery). In that case, a landing place can include a plurality of charging facilities (power supply facilities) that charge the battery. Particularly, the landing facility 200 includes a power supply facility 221 and an attached power supply facility 222. The power supply facility 221 is a facility in which power can be supplied to the aircraft 100 in a landing state, and the attached power supply facility 222 is a facility in which power can be supplied to the aircraft 100 in a non-landing state. The number of the power supply facility 221 for the landing facility 200 is basically one, but may be more than one, and, in that case, processing may be performed on an assumption that the landing facility 200 is present for each power supply facility 221. One or a plurality of the attached power supply facilities 222 are provided for the power supply facility 221.

As illustrated in FIG. 2, the power supply information determination system 1 can include the aircraft 100 and the landing facility (take-off and landing facility) 200, and can also include the power supply information determination apparatus 300. The take-off and landing facility 200 can include a fence 201 and a sensor 202.

The fence 201 defines a take-off and landing place 203. The fence 201 is installed in such a way as to surround the take-off and landing place 203. In other words, an inside of the fence 201 is the take-off and landing place 203. The fence 201 is a soundproof fence, and has a soundproof function of reducing noise during taking off and landing. The fence 201 is formed of a transparent polycarbonate and the like. The fence 201 is open upward.

Further, the power supply facility 221 may be provided at an appropriate place of the take-off and landing place 203. Furthermore, the take-off and landing facility 200 may include, as the attached power supply facility 222, a wired power supply facility **222*a* and a wireless power supply facility 222*b*, and the wired power supply facility 222*a* and the wireless power supply facility 222*b* can be attached around the fence 201, for example. A non-contact power supply facility (wireless power supply facility) 222*b* includes a power supply unit 222*ba* that supplies power to a terminal 104 side hanging from the aircraft 100 via a cable 102 in a non-contact manner by an electromagnetic wave or the like. The wired power supply facility 222*a* is connected and supplies power to a terminal 103 hanging from the aircraft 100 via the cable 102. In this way, the attached power supply facility 222 preferably includes at least one of the wired power supply facility and the non-contact power supply facility. Further, from a viewpoint of power supply efficiency, it is desirable that at least one of the attached power supply facility 222 and the power supply facility 221 is a facility that supplies power to the aircraft 100** by using a superconducting system.

Note that a part of the fence 201 may have a structure and the like for releasing wind generated by rotation of the rotor 101. For example, a part of the fence 201 may have a mesh structure. Alternatively, a part of the fence 201 may be provided with an opening and the like. For example, when the aircraft 100 is small, the fence 201 can have a height of about 10 m. In FIG. 2, the fence 201 is formed in a circular shape (cylindrical shape) in such a way as to surround the take-off and landing place 203, but a shape of the fence 201 is not particularly limited. For example, a shape of the fence 201 in a top view may be a rectangle of about several tens of meters in one horizontal direction and several tens of meters in another horizontal direction perpendicular to the one horizontal direction.

The sensor 202 is attached to the fence 201. For example, the sensor 202 is a laser, a camera, light detection and ranging (LiDAR), a laser sensor, a distance sensor, and the like. The sensor 202 is disposed inside the fence 201. The sensor 202 is provided in the fence 201 in order to detect an altitude and a horizontal position of the aircraft 100 during flying. The sensor 202 detects a position of the aircraft 100 during flying inside the fence 201. In other words, the sensor 202 tracks a position of the aircraft 100 during landing.

Further, in FIG. 2, in the fence 201, one sensor 202 is disposed, but a plurality of the sensors 202 may be disposed. The plurality of sensors may be installed in different positions inside the fence 201. Furthermore, different types of sensors may be combined and estimate a position of the aircraft 100. Detection accuracy of a position can be improved by using the plurality of sensors. Furthermore, the sensor 202 can be individually provided for the attached power supply facility 222, but may be common to a sensor for the power supply facility 221.

The aircraft 100 lands on a landing place (i.e., landing position) 204 inside the take-off and landing place 203. For example, after the aircraft 100 moves to immediately above the take-off and landing place 203, the aircraft 100 gradually reduces an altitude. Then, the aircraft 100 is lowered to a ground surface. The aircraft 100 stores position coordinates indicating the landing place 204. An altitude of the landing place 204 may be set as 0. Therefore, the aircraft 100 performs an autonomous flight from a take-off place toward horizontal direction coordinates indicating the take-off and landing place 203 or the landing place 204. Of course, a take-off place and a landing place may be the same.

Further, the take-off and landing facility 200 may also include a take-off and landing platform 206 and a blowing mechanism 231. The take-off and landing platform 206 constitutes the take-off and landing place 203. Further, the power supply facility 221 may be provided on the take-off and landing platform 206. In other words, an upper surface of the take-off and landing platform 206 is the take-off and landing place 203. The aircraft 100 lands on the take-off and landing platform 206. The take-off and landing platform 206 has a structure that passes wind. For example, at least a part of the take-off and landing platform 206 has a mesh structure. Alternatively, a part of the take-off and landing platform 206 may be provided with an opening.

The blowing mechanism 231 is provided on a lower side of the take-off and landing place 203. The blowing mechanism 231 includes a fan and the like, and blows air to the aircraft 100 during landing. In other words, the blowing mechanism 231 generates upward wind in a vertical direction.

A control unit 211 controls the blowing mechanism 231, based on positional information. In this way, landing of the aircraft 100 can be assisted. Particularly, the aircraft 100 consumes a lot of power (electric power) during hovering, and thus such an assist is beneficial. For example, the control unit 211 controls a rotation speed of the fan according to an altitude of the aircraft 100. The aircraft 100 can be gradually lowered. In this way, the blowing mechanism 231 for blowing air to the aircraft 100 is provided on the landing facility 200 side. Thus, landing control can be performed more easily and appropriately. Further, the blowing mechanism 231 may blow air to the aircraft 100 during taking off. Take-off control can be performed more easily and appropriately. Further, a blowing mechanism similar to the blowing mechanism 231 can be provided not only in the power supply facility 221 but also on the attached power supply facility 222 side.

The power supply information determination apparatus 300 according to the present example embodiment is an information processing apparatus of a computer. For example, the power supply information determination apparatus 300 is a server apparatus connected to a network such as the Internet. The power supply information determination apparatus 300 is not limited to a physically single apparatus. For example, a plurality of processors may perform later-described processes in a cooperative manner.

The power supply information determination apparatus 300 according to the present example embodiment includes an acquisition unit 301, a determination unit 302, and a communication unit 303. The acquisition unit 301 acquires aircraft information and place information about each of the one or the plurality of landing places (landing facilities 200) including equipment on which the aircraft 100 being a battery-driven vertical take-off and landing aircraft capable of autonomously flying can land.

The aircraft information is information about an aircraft flying in a surrounding region (zone) of a landing place. The aircraft information may include an airframe ID such as an identification number for identifying each aircraft (i.e., each airframe). A unique airframe ID is assigned to each of the aircraft 100. The place information is information about a landing place (landing facility 200), including facility information indicating the power supply facility 221 and the attached power supply facility 222 that are provided at the landing place. The facility information may include information indicating a place (coordinates) of the facility. Acquisition of the aircraft information and the place information can be performed by communication with the aircraft 100 or by communication with the aircraft 100 after radar detection.

Further, the aircraft information may include current coordinates of the aircraft 100, a shortest arrival time to a facility, an average flight time to the facility, a distance to the facility, charging performance, performance other than the charging performance, a flight purpose, a scheduled flight path (including a flight destination), the flight destination, and an airframe state. Further, the aircraft information may also include a flight plan including the facility as an arrival point or a way point in addition to the current coordinates. The aircraft information preferably includes at least one piece of the information described above. Since the aircraft information is present for each of the aircrafts 100, it can be said that the number of the aircraft 100 flying inside the surrounding region (zone) of the landing place may also be acquired as the information.

The current coordinates can be used for considering a deviation from a current scheduled flight path (scheduled flight plan). Further, the information indicating charging performance corresponds to charging function information about the aircraft 100. For example, the charging function information may include information indicating which of enabling wired power supply and wireless power supply/enabling only wired power supply/enabling only wireless power supply applies, information indicating time and power needed for a power supply preparation, information indicating time and power needed for landing, and the like. The flight purpose may include information such as a priority level of a person and a load, and may also include information indicating urgency of a flight.

The information (performance information) indicating the performance other than the charging performance may include data about at least one of weight, size, ability as to turning movement, tolerance to wind, maximum flight speed, and maximum flight altitude of the aircraft 100. Note that a possible longest flight time and a remaining amount of a power source may also be included in the performance information. Further, the performance information may include information indicating whether the aircraft is a manned aircraft or an unmanned aircraft. Furthermore, the performance information may include information indicating whether the aircraft is an emergency aircraft (i.e., emergency airframe) such as a police aircraft, a fire aircraft, or an ambulance aircraft. The acquisition unit 301 may specify the performance information of the aircraft 100 based on the type (e.g., the model) and the airframe ID thereof.

The information indicating an airframe state preferably includes information about at least one of a failure state, a remaining amount of a battery (a battery 116 in FIG. 3), a possible longest flight distance, and a possible longest flight time, of the aircraft 100. All of the information can be handled as flight capability information about the aircraft 100. Further, the information indicating a failure state (a degree of failure) and urgency of a flight described above can be separately handled as information indicating an urgency degree of the aircraft 100. When a battery with an electric motor and the like as power is a power source, a remaining amount of the battery corresponds to a charging remaining amount (battery remaining amount) of the battery. Note that, when a remaining amount of the battery 116 and performance in the aircraft information are present as the information, a possible longest flight distance and a possible longest flight time can be calculated. Further, a possible longest flight time and a remaining amount can also be calculated based on the possible longest flight distance and the performance, and a possible longest flight distance and a remaining amount can also be calculated based on the possible longest flight time and the performance.

Further, it is inefficient to consume maximum power for charging, and thus, by adopting the aircraft information (particularly, information about time and a distance) as described above, a determination described below can be achieved by considering worst power efficiency during hovering in addition to whether power supply is simply performed at a way point and the like.

Further, the place information may include information of at least one of coordinates of the facility (the facility at a landing place inside a zone), the current empty number of facilities in the facility, and availability of the current empty number of the facilities. The coordinates of a facility indicate a place (coordinates) of each facility (power supply facility or attached power supply facility) in a take-off and landing facility (take-off and landing port) or a landing facility (landing port). The place information may be an ID indicating the facility. The number of landing places inside a zone is not limited to one, and, when a plurality of landing places are present inside a zone, the number, coordinates, an empty number, and availability, of an attached power supply facility, may also be included for each landing place.

Note that, in the present example embodiment, a description of distance and time is given in consideration of a distance and time to each of the attached power supply facilities 222, but a distance and time to the attached power supply facility 222 may be set as a distance and time to the landing facility 200 to which the attached power supply facility 222 is attached, or the power supply facility 221.

The determination unit 302 performs a determination of a facility of one of the power supply facility 221 and the attached power supply facility 222 of each aircraft 100, a power supply start time to the facility, and a waiting period, based on the aircraft information about each aircraft 100 and the place information about each landing place that are acquired by the acquisition unit 301. A determination target preferably includes a power supply period for scheduling. Of course, the power supply start time may be set as a power supply start date and time. Further, the determination may also include a determination of a flight path to a facility for each of the aircrafts 100. In other words, the determination unit 302 performs a determination of a facility and the like, based on the number of the aircrafts 100 inside the above-described zone, and the like.

The flight path is a movement path from a current point (i.e., current position) to the facility. The flight path is information indicating a trajectory that passes through target points (i.e., target positions) of the aircraft 100. Further, a scheduled flight time may be associated with each of the target points in the flight path. The flight path is, for example, composed of a set of three-dimensional coordinates indicating target points. Specifically, the flight path is data in which three-dimensional coordinates are arranged in a chronological order. A flight path is generated by connecting three-dimensional coordinates from one to another.

Further, the determination unit 302 can also determine a flight path, based on an index (congestion information) indicating the congestion level of each of the aircrafts 100 inside the above-described zone, for example. The determination unit 302 divides the above-described zone (flight region) into a plurality of spaces, calculates the number of the aircrafts simultaneously included in the space as the congestion information, and generates a flight path so that the number of aircraft present in any one of the spaces does not exceed a predetermined number. Alternatively, the congestion information may be a value that is determined according to the distance between aircraft. The determination unit 302 generates a flight path so that a distance between one aircraft 100 and another aircraft does not decrease to a certain distance or shorter.

For example, when the possible longest flight time is included as the information indicating an airframe state, the determination unit 302 generates a flight path in such a way as not to exceed the possible longest flight time. Specifically, the determination unit 302 shortens the flight distance for an aircraft 100 of which the possible longest flight time is short, and thereby generates a flight path along which the aircraft 100 can fly without exceeding the possible longest flight time. Needless to say, the determination unit 302 can generate a flight path so as to satisfy performance (i.e., conditions) other than the possible longest flight time.

Furthermore, when the performance information is included in the aircraft information, the determination unit 302 can generate a flight path in such a way as to satisfy performance indicated by the performance information. Furthermore, when the aircraft 100 is an emergency aircraft, the determination unit 302 may preferentially generate a flight path of the aircraft 100 being the emergency aircraft. For example, a flight path is generated in such a way that the aircraft 100 being the emergency aircraft can arrive at the landing place earlier.

Furthermore, it is desirable that the determination target includes a landing place of the aircraft 100 (that is, includes the power supply facility 221). In other words, the determination unit 302 performs a determination of a facility of at least one of the power supply facility 221 and the attached power supply facility 222 of each aircraft 100, a power supply start time to the facility, and a waiting period, based on the aircraft information about each aircraft 100 and the place information about each landing place that are acquired by the acquisition unit 301. Furthermore, it is desirable that the determination target (output target) includes an instruction for landing on the determined landing place. In this case, when a flight path is included in the determination target, the flight path is a movement path from a current point to the landing place via the facility as necessary. In this way, the aircraft 100 can eventually land on the landing place after charging is performed completely or halfway in the attached power supply facility 222.

As described above, the power supply information determination apparatus 300 according to the present example embodiment determines a facility for power supply (assigns a facility to the aircraft 100), and may thus be referred to as a power supply facility determination apparatus or a power supply facility assignment apparatus.

Furthermore, the above-described determination by the determination unit 302 preferably includes a determination of a facility (landing place (empty port), that is, may only be the power supply facility 221 or may include the attached power supply facility 222) to be preliminarily made vacant for an emergency or the like. Note that, even when the aircraft 100 to be a determination target of a facility is driven by a battery, a flight path of the aircraft 100 may also be determined in consideration of a flight path of an aircraft that is not driven by a battery.

Further, the determination unit 302 preferably perform the above-described determination, based on environmental information indicating a flight environment in the above-described surrounding region. The environmental information may include information indicating a flight situation for another aircraft not to be a target of the above-described determination by the determination unit 302. The environmental information may include, for example, weather information about the weather of the flight area.

The environmental information may include, for example, weather information about the weather of the flight area. The weather information may include, for example, rain, fine weather, a wind speed (wind velocity), a wind direction, a precipitation, and the like, and may include, for example, presence and scale of a typhoon and the like. The environmental information can be acquired for each above-described zone, but may be acquired for each of a plurality of zones and assigned to information about each of the zones. The environmental information may be set as information detected by an own sensor of each of the aircrafts 100 or information acquired by communication with another infrastructure, or information acquired by a control side such as the power supply information determination apparatus 300 from a ground infrastructure or a weather radar.

For example, the determination unit 302 can determine a facility and the like so as to avoid a rainy area(s) and/or a windy area(s). In this way, for example, by including the environmental information, the above-described determination can be performed in such a way as to secure many empty ports when an emergency state is more likely to occur. Furthermore, the determination unit 302 may determine a facility and the like, based on the environmental information and the performance information. For example, it is assumed that the performance information includes a tolerance to wind. It is assumed that a wind velocity for each area is included as the environmental information. The determination unit 302 generates a facility, a power supply start time, and a waiting period as to avoid an area(s) in which the wind velocity exceeds a flyable wind velocity indicated by the tolerance to wind. Aircraft can be operated more safely and more efficiently. As described above, the determination unit 302 can determine a facility, a power supply start time, and a waiting period with reference to the environmental information and the performance information.

Alternatively, when the weather information changes, the determination unit 302 may change a facility and the like that have already been determined. For example, when bad weather such as heavy rain or strong wind occurs, the determination unit 302 updates the facility and the like so as to avoid the bad weather area(s). Alternatively, when the weather has improved, the area(s) in which aircraft have not been able to fly until then becomes a flyable area(s). In this case, the determination unit 302 updates the facility and the like so as to pass through the new flyable area. In this way, aircraft can be operated more efficiently. In this case, the determination unit 302 can update the facility and the like so as to satisfy the performance (i.e., conditions) such as a tolerance to wind.

Further, when the weather has worsened and a strong wind occurs, the battery remaining amount may decrease more rapidly than expected. Alternatively, owing to changes in the weather, the battery remaining amount may decrease more slowly than expected. In such a case, the determination unit 302 may update the facility and the like, based on the performance information indicating the latest battery remaining amount. That is, when the power supply information determination apparatus 300 has newly acquired the battery remaining amount, the determination unit 302 may update the facility and the like.

Further, the above-described another aircraft may include a suspicious aircraft such as a suspicious drone, that is, the environmental information may include information indicating the presence/absence of a suspicious aircraft. Examples of the suspicious aircraft include an aircraft of which the airframe ID is not registered in advance. For an aircraft that cannot communicate with the power supply information determination apparatus 300 and another control side, the suspicious aircraft can be captured by radar detection or reception of information about the suspicious aircraft from another ground infrastructure. Further, the environmental information may include information indicating the presence/absence of an emergency aircraft. For example, in the flight area, information indicating a place where a suspicious aircraft or an emergency aircraft flies and/or a time of the flight may be used as a part of the environmental information, or may be included in information about "whether an aircraft is suspicious" as a part of aircraft information. Various sensors for detecting the environmental information may be provided. For example, the environmental information may be measured by a wind velocity sensor or a rainfall amount sensor. Further, various sensors may be provided in the aircraft 100, so that the environmental information may be acquired from the aircraft 100 at all times or as required.

When information indicating that a suspicious aircraft is flying is acquired as the environmental information, the determination unit 302 updates the facility and the like. For example, the determination unit 302 updates the facility and the like so as to avoid an area(s) where the suspicious aircraft exists.

The communication unit 303 transmits, to the corresponding aircraft 100, information indicating the facility (the power supply facility 221 or the attached power supply facility 222) of each of the aircrafts 100, the power supply start time, and the waiting period that are determined by the determination unit 302. Herein, the communication unit 303 performs processing, for example, in conformity with communication standards such as 5G, 4G, Wi-Fi (registered trademark), and BlueTooth (registered trademark). The communication unit 303 transmits radio signals to aircraft 100 and a terminal(s) 400 (which will be described later). Further, the communication unit 303 receives radio signals from the aircraft 100 and the terminal(s) 400. In this way, data and information can be transmitted and received between the user side such as the aircraft 100 and the server side such as the power supply information determination apparatus 300. Further, the communication unit 303 may be formed in such a way as to also perform communication with the landing facility 200 in a wired or wireless manner. By transmitting, to the landing facility 200, the facility, the power supply start time, and the waiting period as described above by the communication unit 303, the landing facility 200 can schedule and perform power supply, based on the information.

By such communication, each of the aircrafts 100 can set the determined facility and perform an autonomous flight to the facility until the determined power supply start time (while appropriately waiting for the waiting time). For example, whether there is an empty power supply facility 221 is determined, and, when there is not empty power supply facility 221, the facility is determined in such a way that the aircraft 100 is guided to the attached power supply facility 222. Note that one or a plurality of waiting places may also be determined, or a place near the facility may be determined in advance as a waiting place.

Further, for example, a facility and a power supply start time may be determined according to a power supply priority level (a priority order in which power supply is needed in a hurry or power supply necessity) among the aircrafts 100, and the like. As one example, for example, by considering a charging remaining amount and a failure state, the aircraft 100 that has a sufficient charging remaining amount and is not in failure can be guided to a farther landing place in case of emergency. Further, by performing a determination of an empty port, an empty facility of power supply for preparing for an emergency can also be secured by such communication.

In fact, since the aircraft 100 has a limited battery capacity, a landing place may not be able to be used as originally scheduled and may need to be changed according to various situation changes in a surrounding region such as an environmental change in weather and the like, and flying of a suspicious aircraft. In an extreme example, for example, a situation in such a way that all aircrafts need to land at once may also occur. In contrast, in the present example embodiment, the power supply facility (one of the power supply facility 221 and the attached power supply facility 222) of each of the aircrafts 100 can be secured by handling a situation change in a surrounding region of each of one or a plurality of landing places. In this way, the present example embodiment can efficiently determine information about power supply (herein, a facility used for power supply and the like) for a plurality of aircrafts according to a situation change in a surrounding region of each of one or a plurality of landing places. In this way, each of the aircrafts 100 can be appropriately charged according to a situation change. In other words, the present example embodiment can perform scheduling of a facility of power supply used for each of the aircrafts 100 in such a way as to be able to efficiently supply power to each of the aircrafts 100.

Note that the power supply information determination apparatus 300 may be provided at one landing place, and may perform a determination about another landing place. Further, the power supply information determination apparatus 300 may be provided at a plurality of landing places. The power supply information determination apparatus 300 can determine the power supply information for each landing place. However, at one landing place, one power supply information determination apparatus 300 dedicated to the place may be provided.

Further, the determination unit 302 may also perform the above-described determination by the determination unit 302 by using a learned model that inputs the information acquired by the acquisition unit 301 and outputs a result of the above-described determination by the determination unit 302. A type and an algorithm of the learned model are not limited, but, particularly, a prediction-based model can be suitably used.

Further, the above-described determination by the determination unit 302 may be performed when a landing request that specifies a landing place is received by the communication unit 303 from one or more aircrafts 100. Alternatively, the above-described determination by the determination unit 302 may be performed when a request for landing on a landing place that is not present in a scheduled flight path is received by the communication unit 303 from one or more aircrafts 100.

As in this example, the determination unit 302 may dynamically determine a facility and the like. For example, when the power supply information determination apparatus 300 acquires new information, a facility and the like that have already been determined are changed. Thereby, the facility and the like to be used by the aircraft 100 during flying are updated. Then, the power supply information determination apparatus 300 transmits the updated facility and the like to the aircraft 100 during flying. The aircraft 100 receives the updated facility and the like. Thus, the aircraft 100 flies toward the newly updated facility and the like. In this way, the plurality of aircrafts 100 can be operated more efficiently.

Figure 3:
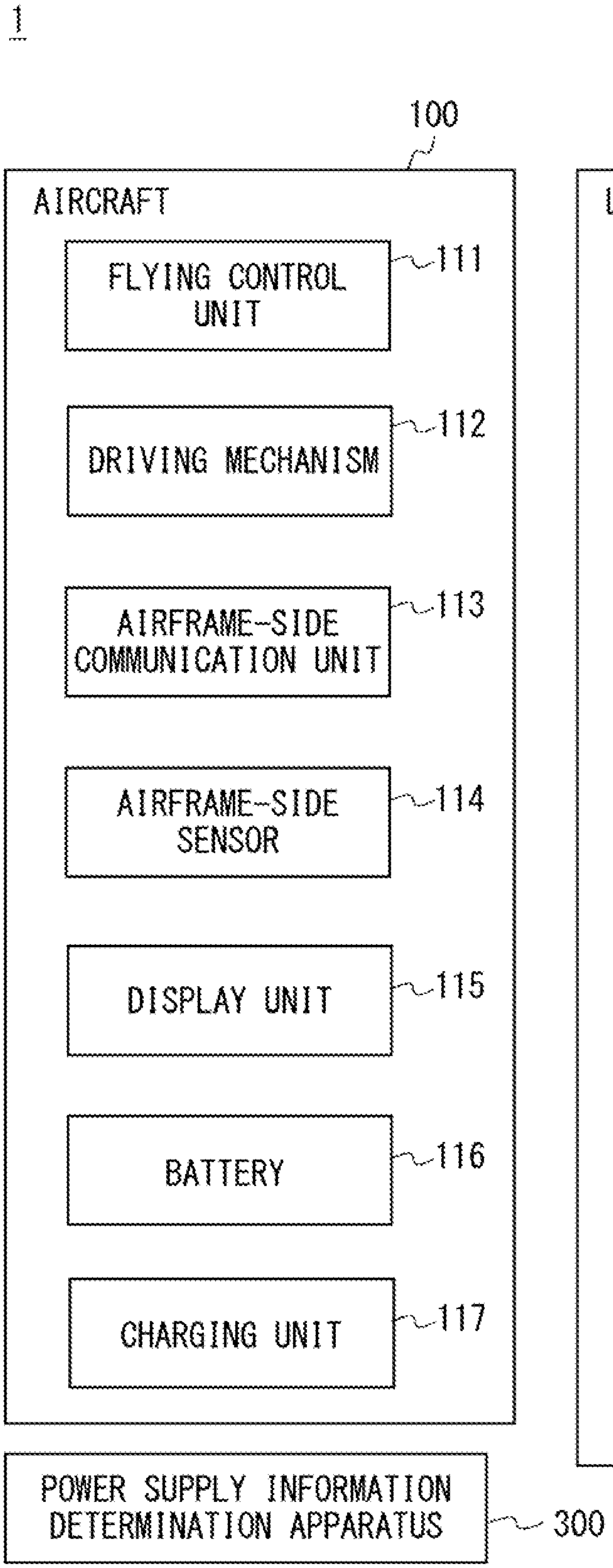
FIG. 3 is a control block diagram of the power supply information determination system.

Next, a configuration of the aircraft 100 and the landing facility 200 will be described. FIG. 3 is a functional block diagram mainly showing the configuration of the aircraft 100 and the landing facility 200. The aircraft 100 includes a flying control unit 111, a driving mechanism 112, an airframe-side communication unit 113, an airframe-side sensor (s) 114, a display unit 115, the battery 116, and a charging unit 117.

The flying control unit 111 controls each component. For example, the driving mechanism 112 includes rotor blades 101 and a motor therefor, and generates lift and thrust necessary for flight. The flight control unit 111 outputs a drive signal for controlling the driving mechanism 112. In the example shown in FIG. 1, the flight control unit 111 controls the driving mechanism 112 so that the driving mechanism 112 independently drives four rotor blades 101. The flying control unit 111 stores coordinates of the landing place 204 (power supply facility 221) and the attached power supply facility 222 in a memory and the like.

The flying control unit 111 controls the driving mechanism 112 so that the aircraft 100 autonomously flies to above the landing place 204 or the attached power supply facility 222.

For example, the flying control unit 111 stores, in the memory and the like, the flight path received by the flight path generation apparatus that is not illustrated. The flying control unit 111 controls the driving mechanism 112 so that a flight is performed based on setting of a facility and the like received from the power supply information determination apparatus 300. For example, the flight control unit 111 controls the driving mechanism 112 so that the position of the own aircraft moves along the flight path. When the position of the own aircraft is deviated from the flight path due to wind or the like, the aircraft 100 flies so as to get close to the flight path. The position of the own aircraft can be detected by the airframe-side sensor 114. When information about the facility and the like is received from the power supply information determination apparatus 300, the flight path in the above-described memory may be updated.

The airframe-side communication unit 113 wirelessly communicates with a ground side, i.e., with the landing facility 200 and the power supply information determination apparatus 300. The airframe-side communication unit 113 performs processing, for example, in conformity with communication standards such as 5G, 4G, Wi-Fi (registered trademark), and BlueTooth (registered trademark). The airframe-side communication unit 113 transmits radio signals to the ground side. The airframe-side communication unit 113 receives radio signals from the ground side. In this way, data and information can be transmitted and received between the aircraft 100 and the take-off and landing facility 200.

The airframe-side sensor 114 detects information about the flight state of the aircraft 100. The airframe-side sensor 114 includes, for example, a gyro sensor that detects the attitude of the airframe. Further, the airframe-side sensor 114 may include a positioning sensor that detects the position of the own aircraft. As the positioning sensor, for example, a satellite positioning sensor such as a GPS may be used. The flight control unit 111 controls the driving mechanism 112 based on the detection by the airframe-side sensor 114. In this way, the aircraft 100 can perform an autonomous flight to above the landing place 204. Further, the airframe-side sensor 114 may include a camera that captures a periphery of the aircraft 100. The airframe-side sensor 114 is not limited to one sensor, and may include a plurality of sensors.

The display unit 115 displays a camera image during flying for a passenger and a user. Note that the camera may be mounted on an airframe-side, or may be provided on the ground side. The camera may be included in the airframe-side sensor 114, or may be included in the sensor 202 on the ground side. The camera on the airframe-side captures an image of the periphery of the aircraft 100. For example, the aircraft 100 captures an image of the take-off and landing facility 200 from above during taking off and landing.

Alternatively, the camera on the ground side captures an image of the aircraft 100 during taking off and landing. In other words, the camera on the ground side captures a situation of a descent of the aircraft 100. Then, the display unit 115 displays the situation of the descent for a passenger and a manipulator. The display unit 115 can also output the situation of the descent by augmented reality (AR). Further, the display unit 115 may display not only a camera image but also information for assisting a take-off and a landing. For example, the display unit 115 may display positional information, a deviation amount, and the like. The positional information or the deviation amount by the sensor 202 is based on a detection result of the sensor 202 as described below. Further, the display unit 115 may display a sensor value of the sensor 202 or the airframe-side sensor 114, and the like. Furthermore, a display content may change according to information about the aircraft 100. For example, the display unit 115 may change a display content according to information about whether a flight is a manned flight or an unmanned flight. Alternatively, the display unit 115 may change a display content according to information indicating whether it is during an automatic operation or during a manual operation (an operation by a manipulator). Note that the display unit 115 can be omitted in a case of an unmanned aircraft. The battery 116 supplies power (electric power) to each apparatus (i.e., to each unit), and the charging unit 117 charges the battery 116 by receiving power supply from the power supply facility 221 or the attached power supply facility 222.

The landing facility 200 is a place on which the aircraft 100 lands. Further, the landing facility 200 may be a place from which the aircraft 100 takes off. For example, after the aircraft 100 lands on the landing facility 200, the aircraft 100 takes off from the landing facility 200. The landing facility 200 includes the sensor 202, the control unit 211, a communication unit 213, a landing platform 203, the power supply facility 221, and the attached power supply facility 222. The sensor 202 detects a position of the aircraft 100 during flying as described above. In the sensor 202, a sensing range is inside the take-off and landing place 203, above the take-off and landing place 203, and above the attached power supply facility 222. Therefore, the sensor 202 detects a horizontal position and an altitude of the aircraft 100 during landing.

The control unit 211 generates positional information about the aircraft 100, based on a detection result of the sensor 202. For example, the control unit 211 estimates a horizontal position and an altitude of the aircraft 100, based on a detection result of the plurality of sensors 202, and sets the horizontal position and the altitude as the positional information. The communication unit 213 transmits, to the aircraft 100, the positional information indicating the horizontal position and the altitude of the aircraft 100. The control unit 211 and the communication unit 213 may be a circuit being integrally formed. The communication unit 213 may be installed inside the fence 201.

The positional information is data indicating an altitude and a horizontal position of the aircraft 100. For example, the control unit 211 calculates a deviation amount from the landing place 204 inside the fence 201 to the aircraft 100, based on a detection signal from the sensor 202. The control unit 211 acquires the deviation amount in each of one direction of horizontal directions and another horizontal direction perpendicular to the one direction. Further, the control unit 211 may acquire a deviation amount (altitude difference) in the vertical direction. Then, the communication unit 213 transmits the deviation amount as the positional information to the aircraft 100. The airframe-side communication unit 113 receives the deviation amount being the positional information.

The flying control unit 111 controls the driving mechanism 112, based on the positional information, in such a way that the aircraft 100 lands on the landing place 204. For example, the flying control unit 111 controls the driving mechanism 112 in such a way as to reduce the deviation amount. In this way, the aircraft 100 can accurately land on the landing place 204, and can be accurately positioned in the attached power supply facility 222. Further, also similarly during taking off and during separation, the aircraft 100 can accurately take off and be separated from the landing place 204 and the attached power supply facility 222.

Alternatively, the control unit 211 calculates a relative position of the aircraft 100 with respect to the fence 201, based on a detection signal from the sensor 202. The control unit 211 acquires a relative position of the aircraft 100 with respect to the fence 201 in each of one direction of the horizontal directions and another horizontal direction perpendicular to the one direction. In other words, the control unit 211 calculates a relative position between the fence 201 and the aircraft 100 in a horizontal plane. In this way, the aircraft 100 can descend to the landing place 204 or the attached power supply facility 222 while keeping a sufficient distance from the fence 201. Thus, an approach to the fence 201 can be prevented. Thus, an influence of wind from the rotor 101 being reflected by the fence 201 can be reduced.

In this way, the aircraft 100 capable of autonomously flying can land or be positioned appropriately. Specifically, the sensor 202 provided in the fence 201 detects the positional information about the aircraft 100 during landing or during positioning. Thus, the position can be detected more accurately than when the positional information is detected by using the satellite measurement system. For example, a measurement error of a position is great in the satellite measurement system. Furthermore, when the fence 201 is located in such a way as to surround the take-off and landing place 203, there is a risk that a satellite signal may not be able to be received. Further, it is difficult for a beacon to detect a horizontal position and an altitude with high accuracy. Furthermore, a sensing range is also limited.

In the present example embodiment, since the sensor 202 is provided inside the fence 201, a horizontal position and an altitude of an aircraft during taking off and landing or during positioning in a take-off and landing facility can be accurately detected. Furthermore, since the fence 201 is provided in such a way as to surround the take-off and landing place 203, noise during taking off and landing can be reduced. Further, safety can be increased. Taking off and landing can be efficiently achieved, and thus power consumption can be suppressed.

Figure 4:
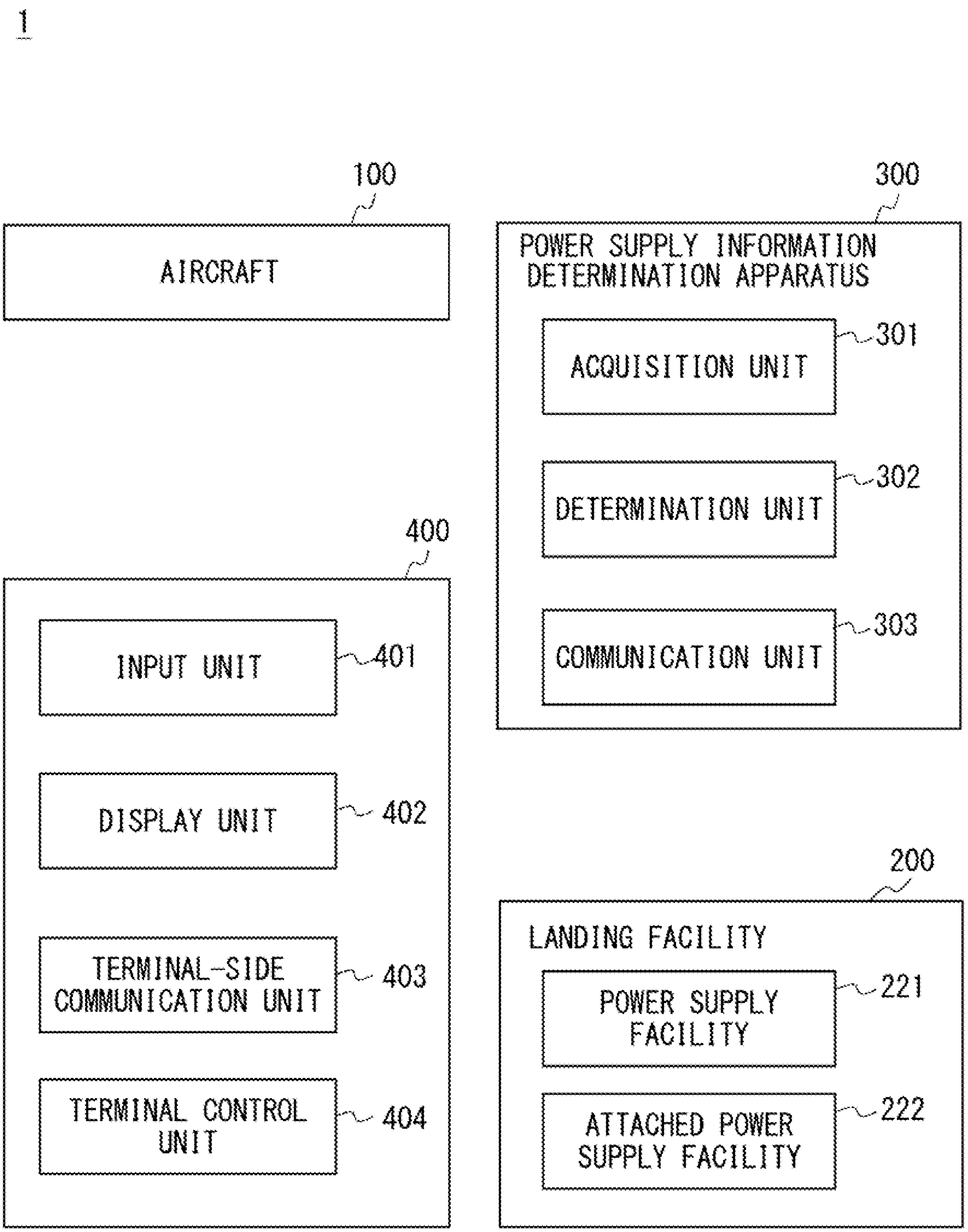
FIG. 4 is another control block diagram of the power supply information determination system.

Next, a configuration of the terminal 400 will be described. FIG. 4 is a functional block diagram mainly showing the configuration of the terminal 400. The terminal 400 is an apparatus through which the user or the like of the aircraft 100 enters necessary information. The terminal 400 is, For example, an information processing apparatus such as a smartphone or a personal computer. The terminal 400 includes an input unit 401, a display unit 402, a terminal-side communication unit 403, and a terminal control unit 404. The airframe-side communication unit 113 (FIG. 3) of the aircraft 100 also wirelessly communicates with the terminal 400. Note that at least some of the processes performed by the terminal 400 may be performed by a processor or the like provided in the aircraft 100. Further, the terminal 400 may be disposed in the aircraft 100.

The input unit 401 includes an input device such as a touch panel, a keyboard, a mouse, and a voice input microphone, and receives inputs from the user. For example, the user enters a destination (including a case of being a received and determined facility), a scheduled power supply time (or a scheduled landing time), a scheduled power supply period, a scheduled taking-off time, and the like by operating the input unit 401. Further, the user may enter an intermediate point(s) or the like between the take-off place and the landing place by operating the input unit 401. The display unit 402 includes a display device and displays a window through which the user enters instructions.

Furthermore, when the determination unit 302 determines a flight path with respect to one aircraft 100, the determination unit 302 may generate a plurality of the flight paths. The communication unit 304 transmits a plurality of flight paths to the terminal 400 or the aircraft 100 as flight path candidates. The power supply information determination apparatus 300 presents (i.e., shows) the plurality of flight path candidates to the user. The display unit 402 of the terminal 400 displays the flight path candidates. The display unit 402 may present flight paths to the user through AR (Augmented Reality) display or VR (Virtual Reality) display. For example, the display unit 402 displays flight paths on a head-mounted display or the like. Alternatively, the display unit 402 may perform AR display by projecting a display image including flight paths onto the windshield or the like. Then, the user selects one of a plurality of displayed flight path candidates by operating the input unit 401. The flight path candidate selected by the user is stored as the flight path in the memory in the aircraft 100.

In the above-described description, the power supply information determination apparatus 300 performs various types of processing and the like, but the aircraft 100 and the terminal 400 may perform at least a part of the processing. Further, the power supply information determination apparatus 300 may be mounted as a part of the landing facility 200.

Figure 5:
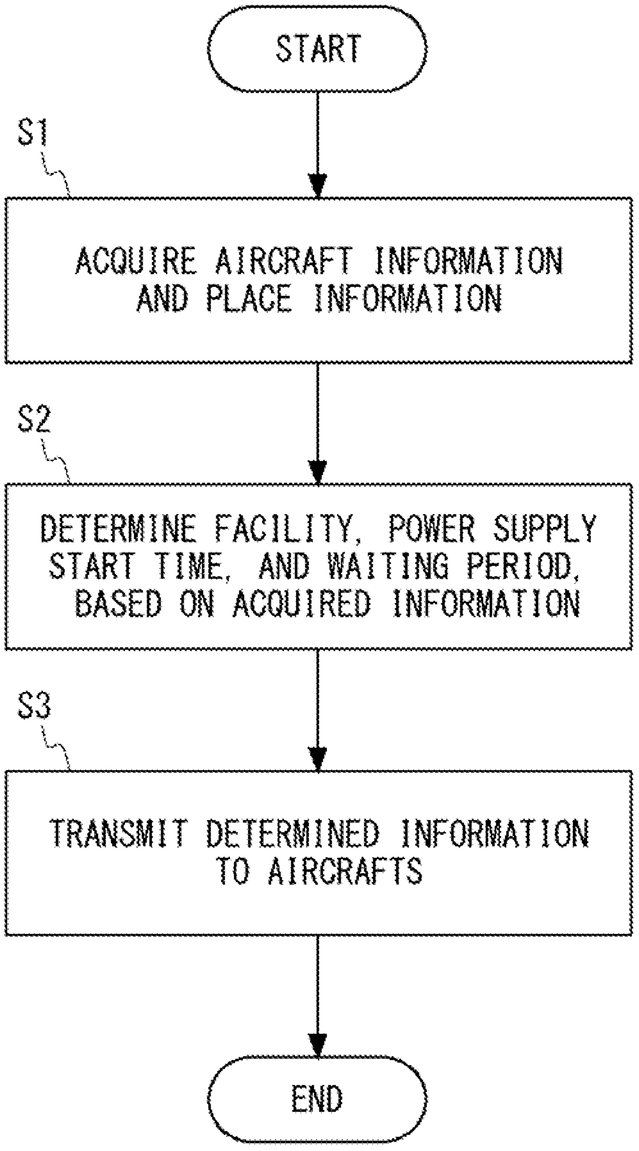
FIG. 5 is a flowchart for illustrating a power supply information determination method according to the first example embodiment.

Next, a power supply information determination method according to the present first example embodiment will be described with reference to FIG. 5. FIG. 5 is a flowchart for illustrating the power supply information determination method according to the first example embodiment. The power supply information determination method according to the present example embodiment acquires aircraft information and place information (step S1), determines a facility, a power supply start time, and a waiting period, based on the acquired information (step S2), and transmits the determined information to the aircrafts (step S3). Steps S1, S2, and S3 may be referred to as an acquisition step, a determination step, and a communication step, respectively. In step S1, the aircraft information and the place information are acquired for each of one or a plurality of landing places including equipment on which an aircraft being a battery-driven vertical take-off and landing aircraft capable of autonomously flying can land. The aircraft information is information about an aircraft flying in a surrounding region of a landing place. The place information is information about a landing place, including facility information indicating a power supply facility that is provided at the landing place and capable of supplying power in a landing state, and an attached power supply facility that is provided at the landing place and capable of supplying power in a non-landing state. In step S2, a determination of a facility of at least one of the power supply facility and the attached power supply facility of each aircraft, a power supply start time to the facility, and a waiting period is performed based on the aircraft information about each aircraft and the place information about each landing place that are acquired in step S1. In step S3, information indicating the facility of each aircraft, the power supply start time, and the waiting period that are determined in step S2 is transmitted to the corresponding aircraft. Note that other examples are as described above.

Other Example Embodiment

Figure 6:
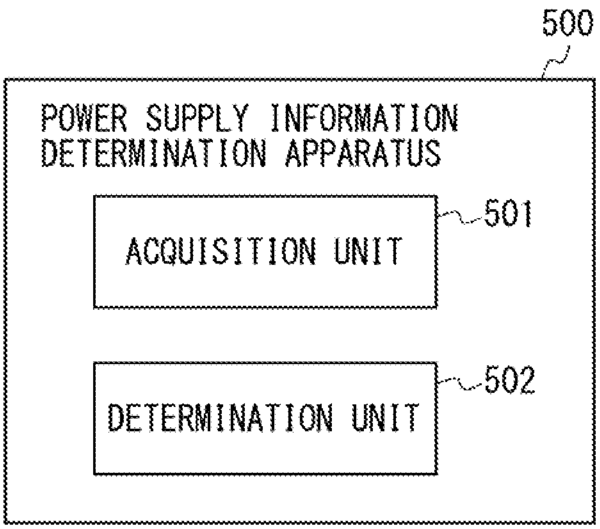
FIG. 6 is a schematic diagram showing a power supply information determination apparatus according to another example embodiment.

A power supply information determination apparatus 500 according to another example embodiment will be described with reference to FIG. 6. The power supply information determination apparatus 500 is different from the power supply information determination apparatus 300 in a determination content, and is an apparatus that determines a power supply priority level of each aircraft 100. Thus, the power supply information determination apparatus according to the present example embodiment may be referred to as a power supply priority level determination apparatus.

The power supply information determination apparatus 500 includes an acquisition unit 501 and a determination unit 502. The acquisition unit 501 acquires, for each of one or a plurality of landing places including equipment on which an aircraft being a battery-driven vertical take-off and landing aircraft capable of autonomously flying can land, aircraft information about an aircraft flying in a surrounding region of a landing place and place information about the landing place. The place information includes facility information indicating a power supply facility that is provided at the landing place and capable of supplying power in a landing state, and an attached power supply facility that is provided at the landing place and capable of supplying power in a non-landing state. The determination unit 502 performs a determination of a priority level for using a facility of at least one of the power supply facility and the attached power supply facility of each aircraft among the aircrafts flying in the above-described surrounding region, based on the aircraft information about each aircraft and the place information about each landing place that are acquired by the acquisition unit 501.

Further, an application example of each piece of information used for a determination and a determination content described in the first example embodiment can also be applied to the present example embodiment. Further, also in the present example embodiment, the power supply information determination apparatus 500 may be formed as one apparatus, but may also be formed as a distributed system in which a function, information about a processing target, and the like are distributed in a plurality of apparatuses, and, in this case, the power supply information determination apparatus 500 may be referred to as a power supply information determination system.

With the configuration as described above, the power supply information determination apparatus 500 according to the present example embodiment can efficiently determine information indicating a power supply priority level for the plurality of aircrafts 100 according to a situation change in a surrounding region of each of one or a plurality of landing places.

Further, in the present example embodiment, an apparatus that determines a facility (facility used for power supply) of each aircraft, a power supply start time, and a waiting period, based on a power supply priority level output from the power supply information determination apparatus (power supply priority level determination apparatus) 500 can be separately provided in a system. In this way, an effect similar to that in the first example embodiment can be achieved.

Figure 7:
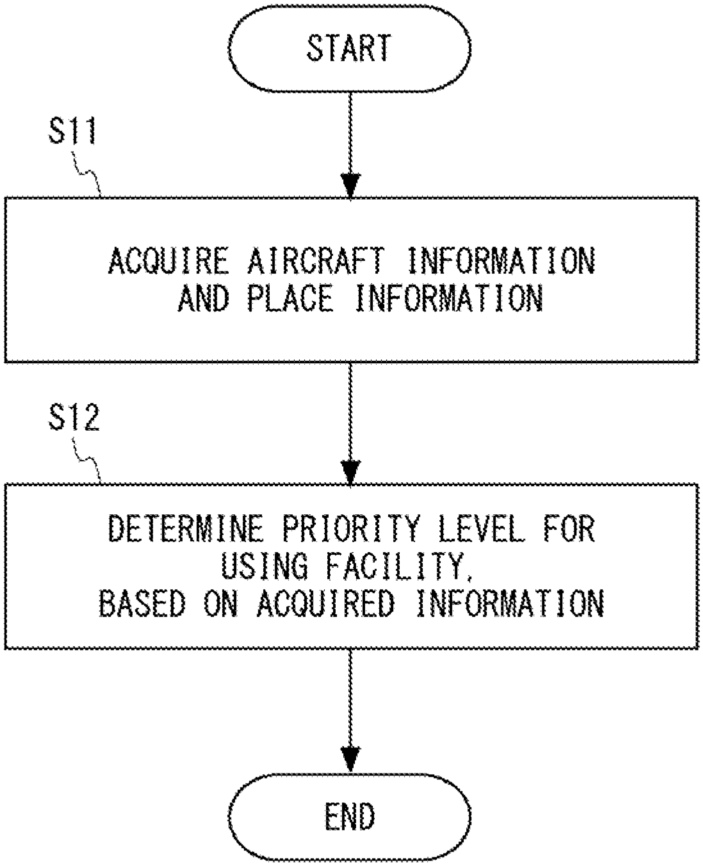
FIG. 7 is a flowchart for illustrating a power supply information determination method according to the another example embodiment.

Next, a power supply information determination method according to the present example embodiment will be described with reference to FIG. 7. FIG. 7 is a flowchart for illustrating the power supply information determination method according to the another example embodiment. The power supply information determination method according to the present example embodiment acquires aircraft information and place information (step S11) similarly to step S1, and determines a priority level for using a facility, based on the acquired information (step S12). In step S12, a determination of a priority level for using a facility of at least one of the power supply facility and the attached power supply facility of each aircraft among the aircrafts flying in the above-described surrounding region is performed based on the aircraft information about each aircraft and the place information about each landing place that are acquired in step S11. Note that other examples are as described above.

<Example of Hardware Configuration>

Figure 8:
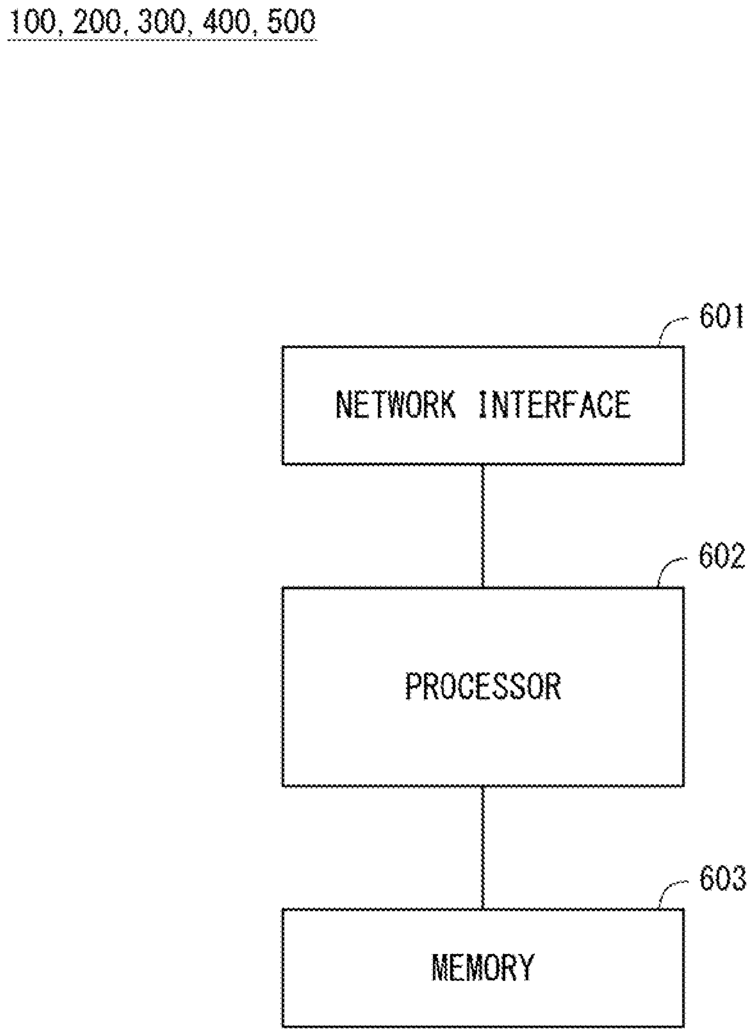
FIG. 8 is a block diagram showing a hardware configuration example.

An example of A hardware configuration of an apparatus according to the first example embodiment or other example embodiments will be described. FIG. 8 is a block diagram showing an example of a hardware configuration for performing information processing in each of the power supply information determination apparatuses 300 and 500, the terminal 400, the landing facility 200, and the aircraft 100. Referring to FIG. 8, the power supply information determination apparatus 300 and the like each include a network interface 601, a processor 602, and a memory 603. The network interface 601 is used to communicate with a network node (e.g., an eNB, an MME, or a P-GW). The network interface 601 may include, for example, a network interface card (NIC) in conformity with IEEE 802.3 series. Note that the eNB represents an evolved Node B, the MME represents a Mobility Management Entity, and the P-GW represents a Packet Data Network Gateway. The IEEE stands for Institute of Electrical and Electronics.

The processor 602 loads software (a computer program) from the memory 603 and executes the loaded software, so that the processor 602 performs the processes performed by the power supply information determination apparatus 300 or the like described in each of the above-described example embodiments described above. The processor 602 may be, for example, a microprocessor, an MPU, or a CPU. The processor 602 may include a plurality of processors.

The memory 603 is composed of a combination of a volatile memory and a nonvolatile memory. The memory 603 may include a storage remotely located from the processor 602. In this case, the processor 602 may access the memory 603 through an I/O (Input/Output) interface (not shown).

In the example shown FIG. 8, the memory 603 is used to store a group of software modules. The processor 602 loads the group of software modules (a computer program(s)) from the memory 603 and executes the loaded software modules, so that the processor 602 can perform the processes performed by the power supply information determination apparatus 300 or the like described in each of the above-described example embodiments.

As described above with reference to FIG. 8, each of the processors included in the power supply information determination apparatus 300 and the like in each of the above-described example embodiments executes one or a plurality of programs including a set of instructions for causing a computer to perform the algorithm described above with reference to the drawings.

In the above-described examples, the program can be stored and provided to a computer using any type of non-transitory computer readable media. Non-transitory computer readable media include any type of tangible storage media. Examples of the non-transitory computer readable medium include magnetic storage media (floppy disks, magnetic tapes, hard disk drives), optical magnetic storage media (e.g., magneto-optical disks). Moreover, this example includes CD-ROM (Read Only Memory), CD-R, CD-R/W. Moreover, this example includes semiconductor memories (e.g., mask ROM, PROM (programmable ROM), EPROM (erasable PROM), flash ROM, and RAM (Random Access Memory)). Further, the program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Furthermore, in each of the example embodiments described above, as illustrated by exemplifying the procedure of the power supply information determination method in the power supply information determination apparatus, the present disclosure may also take the form of the following first or second power supply information determination method. The first power supply information determination method may include an acquisition step, a determination step, and a communication step corresponding to steps S1, S2, and S3 in FIG. 5. The second power supply information determination method may include the acquisition step and the determination step described above corresponding to steps S11 and S12 in FIG. 7. Note that other examples are as described in each of the example embodiments described above. Further, it can be said that the above-described program is a program for causing a computer (or a computer for control included in the power supply information determination apparatus) to perform each step in the first or second power supply information determination method as described above.

Note that the present disclosure is not limited to the above-described example embodiments, and they may be modified as appropriate without departing from the scope and spirit of the disclosure.

Although the present invention has been described with reference to example embodiments (and examples), the present invention is not limited to the above-described example embodiments (and examples). the configuration and details of the present invention may be modified within the scope of the present invention in various ways that can be understood by those skilled in the art.

The whole or part of the example embodiments disclosed above can be described as, but not limited to, the following supplementary notes.

Supplementary Note 1

A power supply information determination apparatus comprising:

an acquisition unit configured to acquire, for each of one or a plurality of landing places each including equipment on which an aircraft being a battery-driven vertical take-off and landing aircraft capable of autonomously flying can land, aircraft information being information about the aircraft flying in a surrounding region of a landing place, and place information being information about the landing place and including facility information indicating a power supply facility that is provided at the landing place and capable of supplying power in a landing state, and an attached power supply facility that is provided at the landing place and capable of supplying power in a non-landing state;

a determination unit configured to perform determination of a facility of at least one of a power supply facility and an attached power supply facility of each aircraft, a power supply start time to the facility, and a waiting period, based on the aircraft information about each aircraft and the place information about each landing place that are acquired by the acquisition unit; and a communication unit configured to transmit, to the corresponding aircraft, information indicating a facility of each aircraft, a power supply start time, and a waiting period that are determined by the determination unit.

Supplementary Note 2

The power supply information determination apparatus according to Supplementary note 1, wherein the determination unit performs the determination, based on environmental information indicating a flight environment in the surrounding region.

Supplementary Note 3

The power supply information determination apparatus according to Supplementary note 2, wherein the environmental information includes information indicating a flight situation for another aircraft not to be a target of the determination.

Supplementary Note 4

The power supply information determination apparatus according to Supplementary note 3, wherein the another aircraft includes a suspicious aircraft.

Supplementary Note 5

The power supply information determination apparatus according to any one of Supplementary notes 1 to 4, wherein the determination includes determination of the facility to be preliminarily made vacant.

Supplementary Note 6

The power supply information determination apparatus according to any one of Supplementary notes 1 to 5, wherein the aircraft information includes information of at least one of current coordinates, a shortest arrival time to the facility, an average flight time to the facility, a distance to the facility, charging performance, performance other than charging performance, a flight purpose, a scheduled flight path, a flight destination, and an airframe state, of the aircraft.

Supplementary Note 7

The power supply information determination apparatus according to Supplementary note 6, wherein information indicating the airframe state includes information of at least one of a failure state, a remaining amount of the battery, a possible longest flight distance, and a possible longest flight time of the aircraft, of the aircraft.

Supplementary Note 8

The power supply information determination apparatus according to any one of Supplementary notes 1 to 7, wherein the place information includes information of at least one of coordinates, a current empty number, and availability, of the facility.

Supplementary Note 9

The power supply information determination apparatus according to any one of Supplementary notes 1 to 8, wherein the determination unit performs the determination when a landing request that specifies the landing place is received by the communication unit from the aircraft.

Supplementary Note 10

The power supply information determination apparatus according to any one of Supplementary notes 1 to 9, wherein the determination unit performs the determination by using a learned model of inputting information acquired by the acquisition unit and outputting a result of the determination.

Supplementary Note 11

The power supply information determination apparatus according to any one of Supplementary notes 1 to 10, wherein the attached power supply facility includes at least one of a wired power supply facility and a non-contact power supply facility.

Supplementary Note 12

The power supply information determination apparatus according to any one of Supplementary notes 1 to 11, wherein at least one of the attached power supply facility and the power supply facility is a facility that supplies power to the aircraft by using a superconducting system.

Supplementary Note 13

A power supply information determination apparatus comprising:

an acquisition unit configured to acquire, for each of one or a plurality of landing places each including equipment on which an aircraft capable of autonomously flying can land, aircraft information being information about the aircraft flying in a surrounding region of a landing place, and place information being information about the landing place and including facility information indicating a power supply facility that is provided at the landing place and capable of supplying power in a landing state, and an attached power supply facility that is provided at the landing place and capable of supplying power in a non-landing state; and a determination unit configured to perform determination of a priority level for using a facility of at least one of a power supply facility and an attached power supply facility of each aircraft among aircrafts flying in the surrounding region, based on the aircraft information about each aircraft and the place information about each landing place that are acquired by the acquisition unit.

Supplementary Note 14

A power supply information determination system comprising:

an acquisition unit configured to acquire, for each of one or a plurality of landing places each including equipment on which an aircraft being a battery-driven vertical take-off and landing aircraft capable of autonomously flying can land, aircraft information being information about the aircraft flying in a surrounding region of a landing place, and place information being information about the landing place and including facility information indicating a power supply facility that is provided at the landing place and capable of supplying power in a landing state, and an attached power supply facility that is provided at the landing place and capable of supplying power in a non-landing state;

a determination unit configured to perform determination of a facility of at least one of a power supply facility and an attached power supply facility of each aircraft, a power supply start time to the facility, and a waiting period, based on the aircraft information about each aircraft and the place information about each landing place that are acquired by the acquisition unit; and a communication unit configured to transmit, to the corresponding aircraft, information indicating a facility of each aircraft, a power supply start time, and a waiting period that are determined by the determination unit.

Supplementary Note 15

A power supply information determination system comprising:

an acquisition unit configured to acquire, for each of one or a plurality of landing places each including equipment on which an aircraft capable of autonomously flying can land, aircraft information being information about the aircraft flying in a surrounding region of a landing place, and place information being information about the landing place and including facility information indicating a power supply facility that is provided at the landing place and capable of supplying power in a landing state, and an attached power supply facility that is provided at the landing place and capable of supplying power in a non-landing state; and a determination unit configured to perform determination of a priority level for using a facility of at least one of a power supply facility and an attached power supply facility of each aircraft among aircrafts flying in the surrounding region, based on the aircraft information about each aircraft and the place information about each landing place that are acquired by the acquisition unit.

Supplementary Note 16

A power supply information determination method comprising:

an acquisition step of acquiring, for each of one or a plurality of landing places each including equipment on which an aircraft being a battery-driven vertical take-off and landing aircraft capable of autonomously flying can land, aircraft information being information about the aircraft flying in a surrounding region of a landing place, and place information being information about the landing place and including facility information indicating a power supply facility that is provided at the landing place and capable of supplying power in a landing state, and an attached power supply facility that is provided at the landing place and capable of supplying power in a non-landing state;

a determination step of performing determination of a facility of at least one of a power supply facility and an attached power supply facility of each aircraft, a power supply start time to the facility, and a waiting period, based on the aircraft information about each aircraft and the place information about each landing place that are acquired in the acquisition step; and a communication step of transmitting, to the corresponding aircraft, information indicating a facility of each aircraft, a power supply start time, and a waiting period that are determined in the determination step.

Supplementary Note 17

A power supply information determination method comprising:

an acquisition step of acquiring, for each of one or a plurality of landing places each including equipment on which an aircraft capable of autonomously flying can land, aircraft information being information about the aircraft flying in a surrounding region of a landing place, and place information being information about the landing place and including facility information indicating a power supply facility that is provided at the landing place and capable of supplying power in a landing state, and an attached power supply facility that is provided at the landing place and capable of supplying power in a non-landing state; and a determination step of performing determination of a priority level for using a facility of at least one of a power supply facility and an attached power supply facility of each aircraft among aircrafts flying in the surrounding region, based on the aircraft information about each aircraft and the place information about each landing place that are acquired in the acquisition step.

Supplementary Note 18

A non-transitory computer-readable medium storing a program for causing a computer to execute:

an acquisition step of acquiring, for each of one or a plurality of landing places each including equipment on which an aircraft being a battery-driven vertical take-off and landing aircraft capable of autonomously flying can land, aircraft information being information about the aircraft flying in a surrounding region of a landing place, and place information being information about the landing place and including facility information indicating a power supply facility that is provided at the landing place and capable of supplying power in a landing state, and an attached power supply facility that is provided at the landing place and capable of supplying power in a non-landing state;

a determination step of performing determination of a facility of at least one of a power supply facility and an attached power supply facility of each aircraft, a power supply start time to the facility, and a waiting period, based on the aircraft information about each aircraft and the place information about each landing place that are acquired in the acquisition step; and a communication step of transmitting, to the corresponding aircraft, information indicating a facility of each aircraft, a power supply start time, and a waiting period that are determined in the determination step.

Supplementary Note 19

A non-transitory computer-readable medium storing a program for causing a computer to execute:

an acquisition step of acquiring, for each of one or a plurality of landing places each including equipment on which an aircraft capable of autonomously flying can land, aircraft information being information about the aircraft flying in a surrounding region of a landing place, and place information being information about the landing place and including facility information indicating a power supply facility that is provided at the landing place and capable of supplying power in a landing state, and an attached power supply facility that is provided at the landing place and capable of supplying power in a non-landing state; and a determination step of performing determination of a priority level for using a facility of at least one of a power supply facility and an attached power supply facility of each aircraft among aircrafts flying in the surrounding region, based on the aircraft information about each aircraft and the place information about each landing place that are acquired in the acquisition step.

REFERENCE SIGNS LIST

100 AIRCRAFT
101 ROTOR
111 FLYING CONTROL UNIT
112 DRIVING MECHANISM
113 AIRFRAME-SIDE COMMUNICATION UNIT
114 AIRFRAME-SIDE SENSOR
115 DISPLAY UNIT
116 BATTERY
117 CHARGING UNIT
200 LANDING FACILITY (TAKE-OFF AND LANDING FACILITY)
201 FENCE
202 SENSOR
203 TAKE-OFF AND LANDING PLACE
204 LANDING PLACE
206 TAKE-OFF AND LANDING PLATFORM
211 CONTROL UNIT
213 COMMUNICATION UNIT
221 POWER SUPPLY FACILITY
222 ATTACHED POWER SUPPLY FACILITY
231 BLOWING MECHANISM
300, 500 POWER SUPPLY INFORMATION DETERMINATION APPARATUS
301, 501 ACQUISITION UNIT
302, 502 DETERMINATION UNIT
303 COMMUNICATION UNIT
400 TERMINAL
401 INPUT UNIT
402 DISPLAY UNIT
403 TERMINAL-SIDE COMMUNICATION UNIT
404 TERMINAL CONTROL UNIT

The invention claimed is:

1. A power supply information determination apparatus comprising:

a communication interface;

at least one processor; and memory storing instructions, when executed by the at least one processor individually or collectively, that cause the power supply information determination apparatus to:

(1) acquire, for each of a plurality of landing places, aircraft information and place information, wherein each landing place of the plurality of landing places comprises a power supply facility and an attached power supply facility, the aircraft information comprises, for each of a plurality of aircraft flying in a surrounding region of the landing place, 1) performance information, 2) purpose information indicating a flight purpose, and 3) state information indicating an airframe state, the state information indicating at least one aircraft of the plurality of aircraft has a failure state, and place information comprising weather environmental information and facility information, the facility information indicating whether 1) the power supply facility of the landing place is capable of supplying power to an aircraft in a landing state, and 2) the attached power supply facility of the landing place is capable of supplying power to an aircraft in a non-landing state;

(2) determine, for an aircraft of the plurality of aircraft, (i) a selected landing place of the plurality of landing places, (ii) a facility of the selected landing place, and (iii) a time related to charging the aircraft, wherein the determination is performed by using a learned model that receives the acquired information as input; and (3) transmit, to the aircraft via the communication interface, information indicating the facility of the selected landing place.

2. The power supply information determination apparatus according to claim 1, wherein the aircraft information further comprises information indicating a flight situation for a suspicious aircraft.

3. The power supply information determination apparatus according to claim 1, wherein the instructions, when executed by the at least one processor individually or collectively, cause the power supply information determination apparatus to:

determine a period of time for the facility of the selected landing place to be vacant.

4. The power supply information determination apparatus according to claim 1, wherein the aircraft information comprises information of at least one of current coordinates, a shortest arrival time to the facility, an average flight time to the facility, a distance to the facility, tolerance to wind as the performance information, charging performance as the performance information, performance as the performance information other than the tolerance to wind and charging performance, a scheduled flight path, and a flight destination.

5. The power supply information determination apparatus according to claim 4, wherein the aircraft information comprises information indicating an airframe state that comprises information of at least one of a remaining amount of a battery, a possible longest flight distance, and a possible longest flight time.

6. The power supply information determination apparatus according to claim 1, wherein the place information comprises information of at least one of coordinates of the facility, a current empty number of the facility, and availability of the facility.

7. The power supply information determination apparatus according to claim 1, wherein the determination is performed after receiving a landing request from the aircraft, the landing request identifying the selected landing place.

8. The power supply information determination apparatus according to claim 1, wherein the attached power supply facility of the selected landing place comprises at least one of a wired power supply facility and a non-contact power supply facility.

9. The power supply information determination apparatus according to claim 1, wherein the facility of the selected landing place is configured to power to the aircraft by using a superconducting system.

10. The power supply information determination apparatus according to claim 1, wherein the time related to charging the aircraft comprises a power supply start time.

11. The power supply information determination apparatus according to claim 1, wherein the time related to charging the aircraft comprises a waiting period.

12. The power supply information determination apparatus according to claim 1, wherein the performance information comprises flight information indicating remaining flight time or power information indicating a charge level of a battery.

13. A power supply information determination method executed by a computer and comprising:

(1) acquiring, for each of a plurality of landing places, aircraft information and place information, wherein each landing place of the plurality of landing places comprises a power supply facility and an attached power supply facility, the aircraft information comprises, for each of a plurality of aircraft flying in a surrounding region of the landing place, 1) performance information, 2) purpose information indicating a flight purpose, and 3) state information indicating an airframe state, the state information indicating at least one aircraft of the plurality of aircraft has a failure state, and place information comprising weather environmental information and facility information, the facility information indicating whether 1) the power supply facility of the landing place is capable of supplying power to an aircraft in a landing state, and 2) the attached power supply facility of the landing place is capable of supplying power to an aircraft in a non-landing state;

(2) determining, for an aircraft of the plurality of aircraft, (i) a selected landing place of the plurality of landing places, (ii) a facility of the selected landing place, and (iii) a time related to charging the aircraft, wherein the determination is performed by using a learned model that receives the acquired information as input; and (3) transmitting, to the aircraft via the communication interface, information indicating the facility of the selected landing place.

14. A non-transitory computer-readable medium storing a program executable by a computer to perform processing comprising:

(1) acquiring, for each of a plurality of landing places, aircraft information and place information, wherein each landing place of the plurality of landing places comprises a power supply facility and an attached power supply facility, the aircraft information comprises, for each of a plurality of aircraft flying in a surrounding region of the landing place, 1) performance information, 2) purpose information indicating a flight purpose, and 3) state information indicating an airframe state, the state information indicating at least one aircraft of the plurality of aircraft has a failure state, and place information comprising weather environmental information and facility information, the facility information indicating whether 1) the power supply facility of the landing place is capable of supplying power to an aircraft in a landing state, and 2) the attached power supply facility of the landing place is capable of supplying power to an aircraft in a non-landing state;

(2) determining, for an aircraft of the plurality of aircraft, (i) a selected landing place of the plurality of landing places, (ii) a facility of the selected landing place, and (iii) a time related to charging the aircraft, wherein the determination is performed by using a learned model that receives the acquired information as input; and (3) transmit, to the aircraft via the communication interface, information indicating the facility of the selected landing place.

* * * * *